US008410976B2

(12) United States Patent
Szajnowski et al.

(10) Patent No.: US 8,410,976 B2
(45) Date of Patent: Apr. 2, 2013

(54) FREQUENCY-MODULATED INTERRUPTED CONTINUOUS WAVE RADAR USING PULSES DERIVED FROM A FREQUENCY-MODULATED SIGNAL IN WHICH THE RATE OF FREQUENCY CHANGE INCREASES AT THE BOUNDARY OF A PULSE REPETITION INTERVAL

(75) Inventors: Jerzy Wieslaw Szajnowski, Guildford (GB); Paul Ratliff, Carshalton Beeches (GB); Wojciech Machowski, Guildford (GB)

(73) Assignee: Mitsubishi Electric Corporation, Tokyo (JP)

( * ) Notice: Subject to any disclaimer, the term of this patent is extended or adjusted under 35 U.S.C. 154(b) by 462 days.

(21) Appl. No.: 12/083,973

(22) PCT Filed: Oct. 24, 2006

(86) PCT No.: PCT/GB2006/003962
§ 371 (c)(1),
(2), (4) Date: Mar. 26, 2009

(87) PCT Pub. No.: WO2007/049029
PCT Pub. Date: May 3, 2007

(65) Prior Publication Data
US 2009/0219193 A1    Sep. 3, 2009

(30) Foreign Application Priority Data
Oct. 24, 2005  (EP) ..................................... 05256585

(51) Int. Cl.
*G01S 13/34* (2006.01)
*G01S 13/93* (2006.01)
*G01S 13/00* (2006.01)
(52) U.S. Cl. ............ 342/131; 342/27; 342/70; 342/118; 342/128; 342/130; 342/132; 342/134; 342/137; 342/175; 342/192; 342/193; 342/195
(58) Field of Classification Search .............. 342/27–51, 342/70–72, 118–145, 175, 192–197, 200–205
See application file for complete search history.

(56) References Cited

U.S. PATENT DOCUMENTS
3,631,484 A * 12/1971 Augenblick .................... 342/46
3,728,724 A *  4/1973 Alpers ......................... 342/128
(Continued)

FOREIGN PATENT DOCUMENTS
EP    1 321 775 A1    6/2003
JP    1-145590 A      6/1989
(Continued)

*Primary Examiner* — Bernarr Gregory
(74) *Attorney, Agent, or Firm* — Birch, Stewart, Kolasch & Birch, LLP

(57) ABSTRACT

An object ranging system operates by transmitting pulses derived from a frequency-swept signal and determining the beat frequency of a combination of the frequency-swept signal and its reflection from an object. A second (or higher) order harmonic is derived from the combination signal. Accordingly, determination of the beat frequency, and hence object range, is significantly enhanced. The frequency sweep is such that frequency changes occur at a substantially higher rate at the beginning of each the pulse repetition interval than at the end. Accordingly, because the frequency changes are concentrated in the period of pulse transmission, even reflections 'from a close object, where the time delay between the source signal and the reflection is very short, will cause a high beat frequency.

14 Claims, 9 Drawing Sheets

U.S. PATENT DOCUMENTS

| | | | |
|---|---|---|---|
| 3,914,762 A * | 10/1975 | Klensch | 342/51 |
| 4,019,181 A * | 4/1977 | Olsson et al. | 342/42 |
| 4,068,232 A * | 1/1978 | Meyers et al. | 342/44 |
| 4,151,525 A * | 4/1979 | Strauch et al. | 342/46 |
| 4,208,659 A * | 6/1980 | Allezard | 342/29 |
| 4,315,260 A * | 2/1982 | Kupfer | 342/125 |
| 4,539,565 A | 9/1985 | Norsworthy | |
| 4,963,887 A * | 10/1990 | Kawashima et al. | 342/44 |
| 5,194,870 A * | 3/1993 | Pearce et al. | 342/128 |
| 5,274,380 A | 12/1993 | Yatsuka et al. | |
| 5,309,160 A | 5/1994 | Powell et al. | |
| 5,481,504 A | 1/1996 | Rosenbach et al. | |
| 5,592,131 A * | 1/1997 | Labreche et al. | 342/175 |
| 5,826,216 A * | 10/1998 | Lyons et al. | 342/70 |
| 6,018,309 A * | 1/2000 | Mitsumoto et al. | 342/200 |
| 6,040,796 A | 3/2000 | Matsugatani et al. | |
| 6,611,225 B2 * | 8/2003 | Mitsumoto et al. | 342/70 |
| 6,646,587 B2 * | 11/2003 | Funai | 342/137 |
| 6,839,019 B2 * | 1/2005 | Noda | 342/130 |
| 7,656,344 B2 * | 2/2010 | Inaba | 342/70 |
| 2003/0117311 A1 | 6/2003 | Funai | |
| 2004/0061642 A1 | 4/2004 | Noda | |

FOREIGN PATENT DOCUMENTS

| | | |
|---|---|---|
| JP | 2000-275333 A | 10/2000 |
| JP | 2004-117173 A | 4/2004 |
| JP | 2004-144696 A | 5/2004 |
| JP | 2004-333269 A | 11/2004 |
| WO | WO-03/044559 A1 | 5/2003 |
| WO | WO-03/044560 A1 | 5/2003 |

* cited by examiner

FREQUENCY-MODULATED INTERRUPTED CONTINUOUS WAVE RADAR USING PULSES DERIVED FROM A FREQUENCY-MODULATED SIGNAL IN WHICH THE RATE OF FREQUENCY CHANGE INCREASES AT THE BOUNDARY OF A PULSE REPETITION INTERVAL

BACKGROUND OF THE INVENTION

1. Field of the Invention

This invention relates to a method for determining the distance to an object, and is especially, but not exclusively, applicable to automotive radar systems which have microwave sensors to detect obstacles using a frequency modulated carrier combined with a pulsed transmission.

2. Description of the Prior Art

One of many systems, such as those described in WO 03/044559 A1, WO 03/044560 A1, U.S. Pat. No. 6,646,587 B2, JP 2000275333, JP2004333269 and JP2004144696, employed for automotive warning and collision avoidance is frequency modulated interrupted continuous wave (FMICW) radar. In such a system, shown in a block form in FIG. 1, the frequency of a carrier generated by an oscillator OSC is linearly swept in a periodic fashion with a period $T_{SW}$ over a predetermined frequency range $\Delta F$ using a frequency modulator FM in a voltage controlled oscillator VCO. A modulation pattern is provided by a linear waveform generator LWG under the control of a control module CM.

The frequency modulated continuous wave (FM-CW) signal is coupled by a coupler CPL to a power amplifier PA where it is amplified, and then gated by means of a transmit-receive switch TRS triggered by the control module CM and operating at a pulse repetition frequency PRI. The transmit-receive switch TRS periodically couples the output of power amplifier PA to an antenna AN for a short interval $\Delta T_T$ to obtain a pulsed RF transmission signal TX directed towards an obstacle OB of interest. During this interval, which is usually a small fraction of a gating period $T_{PRI}=1/\text{PRI}$, the switch TRS keeps the radar receiver disconnected from the antenna. The reflected signal RX, delayed by a time $\tau$ proportional to the object distance D, is detected by the same antenna and coupled to a low-noise amplifier LNA via the transmit-receive switch TRS.

The pulse signal reflected from the obstacle is mixed in a downconverter DR with a reference signal formed by a version of the transmitted signal received from the coupler CPL. Because the transmitted and received pulsed signals are mutually delayed, the instantaneous frequencies of the transmitted and received pulsed signal, are different. Therefore, the beat signal obtained at the output of downconverter has a differential frequency $F_D$, which is directly proportional to the unknown distance D to the obstacle.

The output of the downconverter DR is delivered to a signal processor module SPM, which comprises an analogue-to-digital converter ADC and a digital processor DP driven by clock pulses from a clock CLK. The converter ADC converts the signal from the downconverter DR into a digital signal used by the digital processor DP to determine the beat frequency and hence object range.

The modulation pattern provided by the linear waveform generator LWG may follow, for example, a periodical triangular waveform with a constant slope, as shown in FIG. 2a. Employing this particular waveform is often preferred to other linear modulation schemes (such as sawtooth) since it also allows estimation of the velocity of moving obstacles from the Doppler frequency calculated from a pair of differential frequency shifts derived from transmitted and received signals at rising and falling parts of the triangular waveform.

FIG. 2b shows pulsed signals observed at various points of the system of FIG. 1. It can be seen that the operation of switch TRS ensures that the reflected signal is coupled to the radar receiver only during predetermined time slots $\Delta T_R$, which are outside time slots $\Delta T_T$ used for sending the signal from the transmitter. Such a gating scheme minimises strong signals originating from antenna coupling, which can lead to unwanted effects in the receiver such as saturation of the receiver amplifier and/or the analogue-to-digital converter ADC.

The relationship between beat frequency and object distance should be preserved over the anticipated range of distances. This requires a high degree of linearity of the frequency sweep of the transmitted signal, which imposes strict requirements on the voltage controlled oscillator VCO in the radar transmitter.

The issues related to the linearisation of frequency sweep in radar have been addressed in various ways. Several methods of improvement have been proposed, either by improving the operation of the radar transmitter to achieve a high degree of linearity of the frequency sweep or by minimising the effects caused by such non-linearities.

An example of a possible solution is provided in U.S. Pat. No. 4,539,565. The hardware implementation of the proposed method, aimed to compensate non-linearities of the frequency sweep introduced in the transmitter, is shown in FIG. 3. The data representing the received signal, which experiences phase rotation due to non-linearity present in a frequency sweep in the transmitted signal, is applied to a linearizer. There, the data samples are shifted in time to coincide with those that would have been present for a linear sweep. Alternatively, the data signal may be mixed with a time-dependent correction signal, the frequency of which accounts for non-linearities in the transmitting signal, to achieve a normalised frequency of the beat signal. The normalized beat signal is applied to a processor to establish its frequency spectrum and to divide it into a plurality of frequency bins, so that a signal falling into the bin indicates a corresponding distance to the ranged obstacle. The proposed method can achieve control of linearity to 0.1-0.5%. This is sufficient for most applications, including FMICW radar used for medium- and long-range collision avoidance, where linearity needs to be maintained over time intervals significantly shorter than duration of frequency sweep $T_{SW}$.

In FMICW radar, the envelope, and thus the frequency $F_D$ of the signal is estimated from the received train of pulses, observed during a single frequency sweep of duration $T_{SW}$. In order for such estimation to be accurate, it is necessary to ensure that the received signal is observed for a time interval not less than the duration $T_{SW}$. However, because the period $T_D=1/F_D$ of the beat signal decreases with measured distance D, for distances shorter than a certain critical value such condition cannot be satisfied. Such a particular case is presented in FIG. 2c.

Another limitation of short distance performance of FMICW radar results from the above-described gating scheme performed by the switch TRS. As is shown in FIG. 2b, for time-delays $\tau$ shorter than duration $\Delta T_T$ of transmitted pulses, the duration $\Delta T_{DR}$ (and hence the energy) of the pulses delivered to the downconverter DR is reduced. The shape of such shortened pulses is more likely to be distorted due to, for example, noise and bandwidth limitations in the amplifier LNA and the downconverter DR. As a result, the sampling process performed in the converter ADC at the rate governed by a clock CLK may not correctly determine the amplitude of the pulse. This may lead to errors in estimating the beat frequency from calculations performed in a digital processor DP, and thus a wrong indication regarding obstacle distance.

From the above it follows that FMICW radar systems exploiting the described signal-processing scheme suffer from performance loss at short distances. It would be therefore desirable to develop a novel signal-processing method and an apparatus for improving the performance of FMICW radar particularly at short ranges in a more efficient way than provided by prior art techniques, especially in applications for collision avoidance or/and warning systems.

SUMMARY OF THE INVENTION

Aspects of the present invention are set out in the accompanying claims.

According to a further independent aspect of the invention, in an object ranging system which operates by transmitting pulses derived from a frequency-swept signal and determining the beat frequency of a combination of the frequency-swept signal and its reflection from an object, a second (or higher) order harmonic is derived from the combination signal. Accordingly, determination of the beat frequency, and hence object range, is significantly enhanced.

According to a still further independent aspect of the invention, which may be used with or separately from the aspect described in the preceding paragraph, in an object ranging system which operates by transmitting pulses derived from a frequency-swept signal and determining the beat frequency of a combination of the frequency-swept signal and its reflection from an object, the frequency sweep is such that the frequency changes within each pulse repetition interval at a substantially higher rate at the beginning of the interval than at the end. In prior art systems, because beat frequency is proportional to object range, any inaccuracies in calculating the beat frequency has a proportionately greater effect at close ranges. Accordingly, the present aspect of the invention at least partly compensates this effect, because beat frequency changes, with respect to object distance, are higher for closer objects.

The non-linear frequency sweep may comprise, for example, logarithmic changes throughout each pulse repetition interval, or plural linear changes at different rates within each pulse repetition interval.

BRIEF DESCRIPTION OF THE DRAWINGS

Arrangements embodying the present invention will now be described by way of example with reference to the accompanying drawings.

DETAILED DESCRIPTION OF THE PREFERRED EMBODIMENTS

In order to fully appreciate the benefits and advantages offered by the present invention, the basic performance of an automotive FMICW radar with notional parameters will be considered in Example 1.

EXAMPLE 1

Assume that an automotive FMICW radar operating in the microwave range has the following parameters:

duration $T_{SW}$ of a linear frequency sweep, $T_{SW}$=4 ms;
frequency excursion $\Delta F$ during the sweep, $\Delta F$=80 MH;
pulse repetition interval $T_{PRI}$=2 µs.

Figures 2A, 2B, 2C:
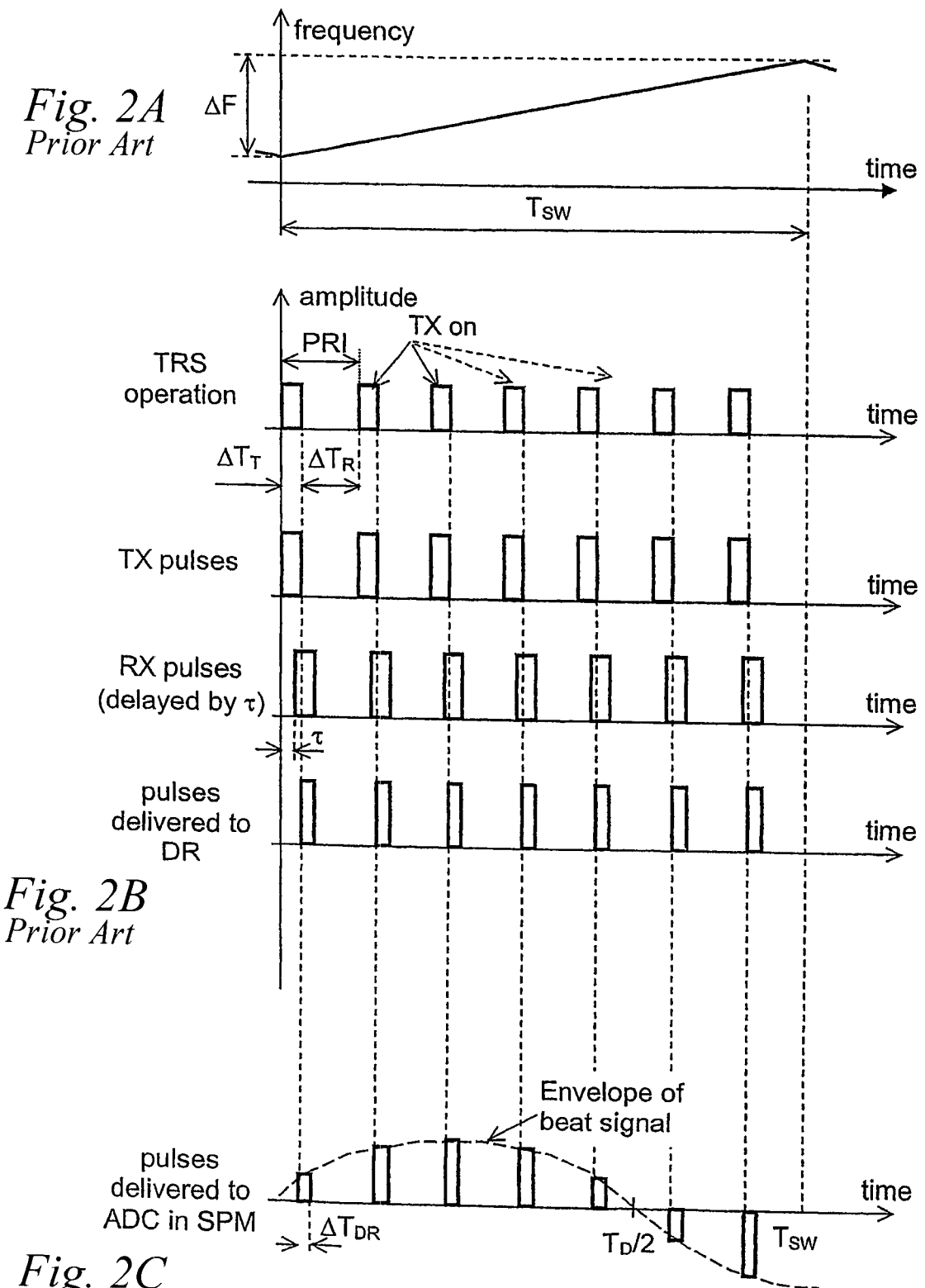
FIG. 2a shows a linear modulation pattern used in the FMICW radar system.
FIG. 2b illustrates pulsed signals observed at various points of the FMICW radar system.
FIG. 2c illustrates a process of reconstructing an envelope of the beat signal in order to estimate its frequency.
Figure 3:
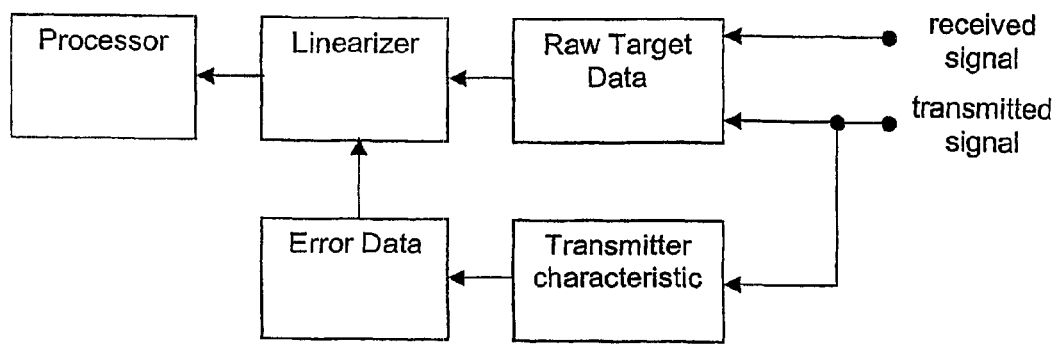
FIG. 3 is a block diagram of a hardware implementation of a network for compensating non-linearities in frequency sweep constructed according to prior art.

FIG. 2a depicts schematically the relationship between time and frequency, the frequency/time characteristic, for the notional automotive radar under analysis.

Because, in this case, the pulse repetition interval $T_{PRI}$ is equal to 2 µs, the unambiguous range of distance measurement will extend to 300 m. In a radar employing a linear frequency sweep, the distance D to an obstacle is determined from the difference $F_D$ between two frequencies: the frequency of a transmitted waveform and that of a waveform reflected by the obstacle, where $$F_D = \frac{2D}{c} S_{FT}$$

where c is the speed of light; $S_{FT}$ is the slope of the frequency/time characteristic, given by $$S_{FT} = \frac{\Delta F}{T_{SW}} = 20 \left[\frac{Hz}{ns}\right]$$

Therefore, in the considered case, an obstacle at a distance D=3 m will give rise to a differential (beat) frequency $F_D$ of 400 Hz.

If the measurement of beat frequency $F_D$ (hence, distance determination) is to be accomplished within the time interval equal to the duration $T_{SW}$ of a frequency sweep, then the width of the frequency step ('bin') of spectral analysis is equal to $1/T_{SW}=250$ Hz. The 3-dB bandwidth and the base of the main lobe are equal to $0.9/T_{SW}$ and $2/T_{SW}$, respectively.

As well known to those skilled in the art this 3-dB bandwidth will increase when a suitably shaped observation window of duration $T_{SW}$ is applied to a received signal to suppress undesired frequency sidelobes. For example, for a Hamming window, the 3-dB bandwidth of the main lobe will be equal to $1.3/T_{SW}$.

Figure 4:
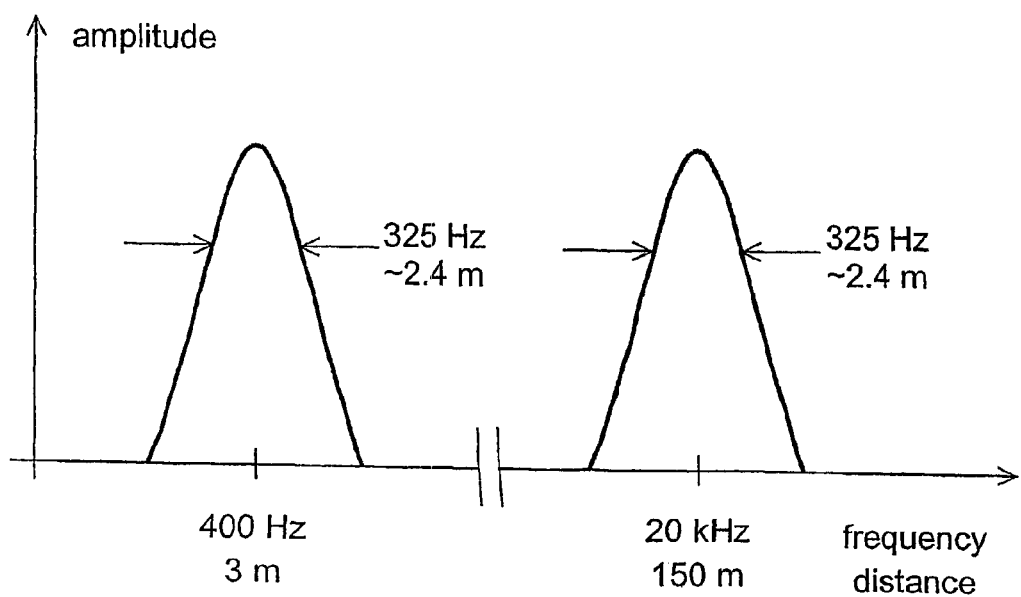
FIG. 4 illustrates the effects of finite observation time in frequency and distance determination.

FIG. 4 illustrates the effects of finite observation time in the process of frequency and distance determination. As seen, due to a constant bandwidth of frequency analysis, the relative error in distance measurement increases at shorter distances, leading to a significant performance degradation.

In an embodiment of the present invention, the frequency sweep employed by a FMICW radar is so designed as to obtain a substantially monotonic, yet non-linear frequency sweep with the following characteristics, as compared with the linear sweep of a notional prior art system:

1. the overall frequency excursion $\Delta F$ remains unchanged or may even be reduced;
2. the (partial) frequency excursion within each pulse repetition interval $T_{PRI}$ remains unchanged or may even be reduced;
3. the duration $T_{SW}$ of a frequency sweep remains unchanged;
4. the frequency/time characteristics in adjacent pulse repetition intervals are suitably shifted replicas of each other;
5. within each pulse repetition interval $T_{PRI}$, the frequency/time characteristic is a monotonic function of time with the slope being steeper for smaller values of time.

Preferably, within each pulse repetition interval $T_{PRI}$, the shape of the frequency/time characteristic will follow that of a logarithmic 'soft limiter', reaching its plateau level at the value of offset time corresponding to the greatest distance of interest. Since, in general, such distance will always be smaller than the unambiguous range of the system, the plateau level will be reached at an offset time smaller than the duration of the pulse repetition interval $T_{PRI}$. The logarithmic shape of the frequency/time characteristic will tend to mitigate the degradation of the radar performance at shorter distances.

Figure 5A:
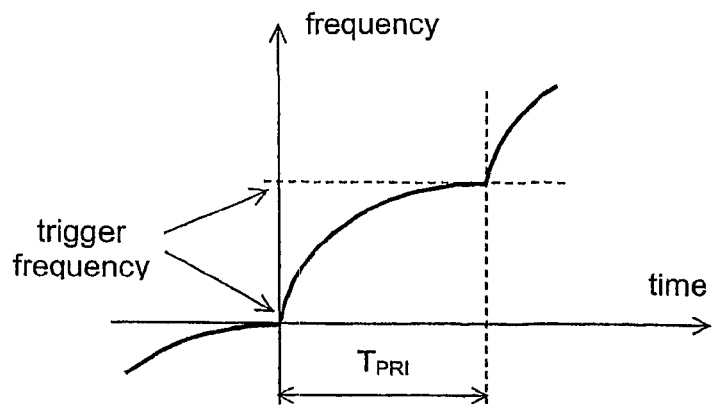
FIG. 5a depicts an example of a segment of the frequency/time characteristic of part of a waveform used in a radar system in accordance with the present invention.

FIG. 5a depicts an example of a segment of the frequency/time characteristic that represents a non-linear frequency up-sweep constructed in accordance with the invention. A complete up-sweep will comprise a plurality of identical non-decreasing sweep segments, the start of each coincides with the trigger tine of a respective transmitted radar pulse. In the following, the frequency corresponding to such trigger time will be referred to as trigger frequency. Therefore, the non-linear frequency sweep will preserve the values of all trigger times and trigger frequencies occurring in the underlying linear sweep with the same sweep duration $T_{SW}$, the same overall frequency excursion AF and the same pulse repetition interval $T_{PRI}$.

Figure 5B:
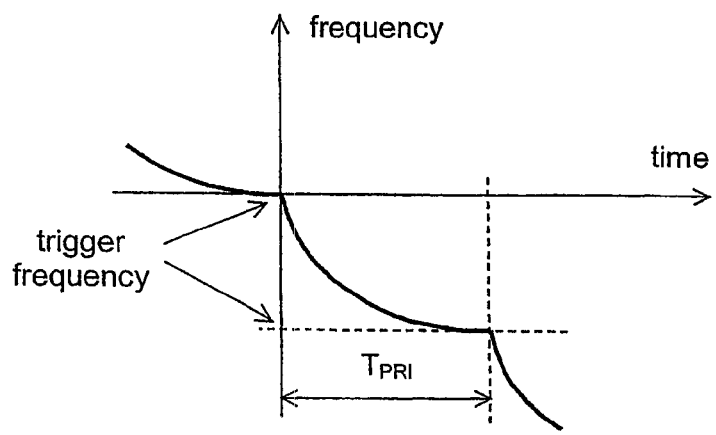
FIG. 5b depicts an example of a segment of the frequency/time characteristic of another part of the waveform.

Similarly, a complete down-sweep will comprise a plurality of non-increasing sweep segments; an example of a suitable sweep segment is depicted in FIG. 5b.

Figure 5C:
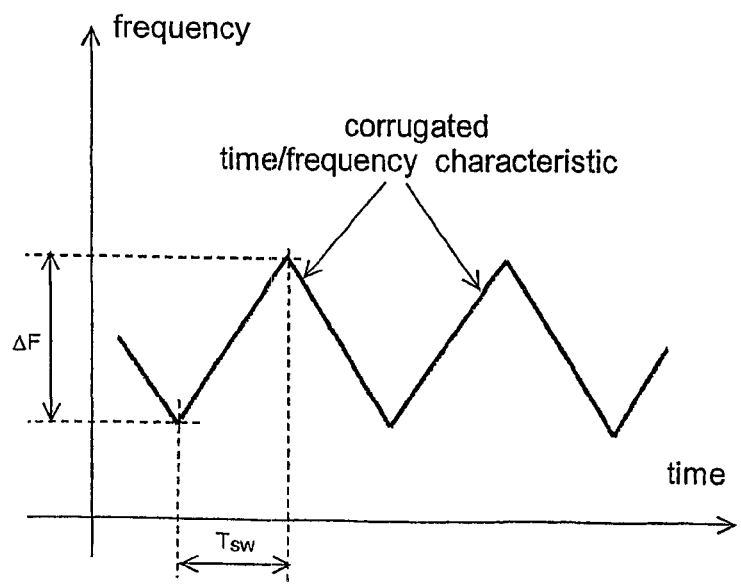
FIG. 5c depicts alternating periods of frequency up-sweeps and down-sweeps, forming a periodic 'corrugated' triangular pattern, of the waveform.

In practical applications, an automotive FMICW radar will produce repeatedly and alternately frequency up-sweeps and down-sweeps forming a periodic 'corrugated' triangular pattern, depicted in FIG. 5c.

Figure 11:
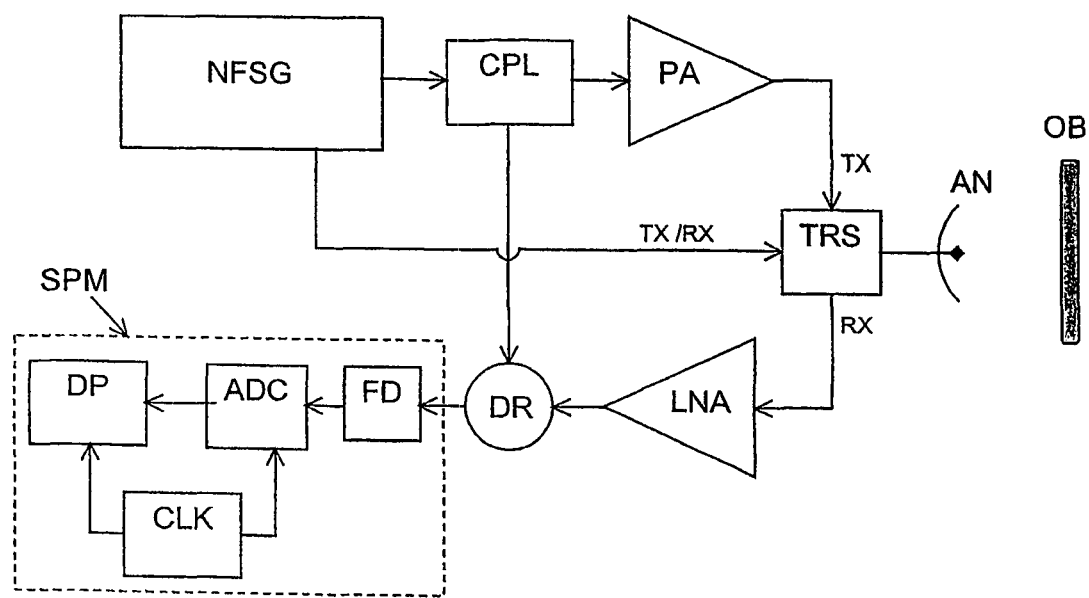
FIG. 11 is a block diagram of a FMICW radar system in accordance with the present invention.

FIG. 11 illustrates an automotive obstacle detection system according to the present invention. The system is similar to that of FIG. 1, and like references denote like integers, except as described below.

Figure 1:
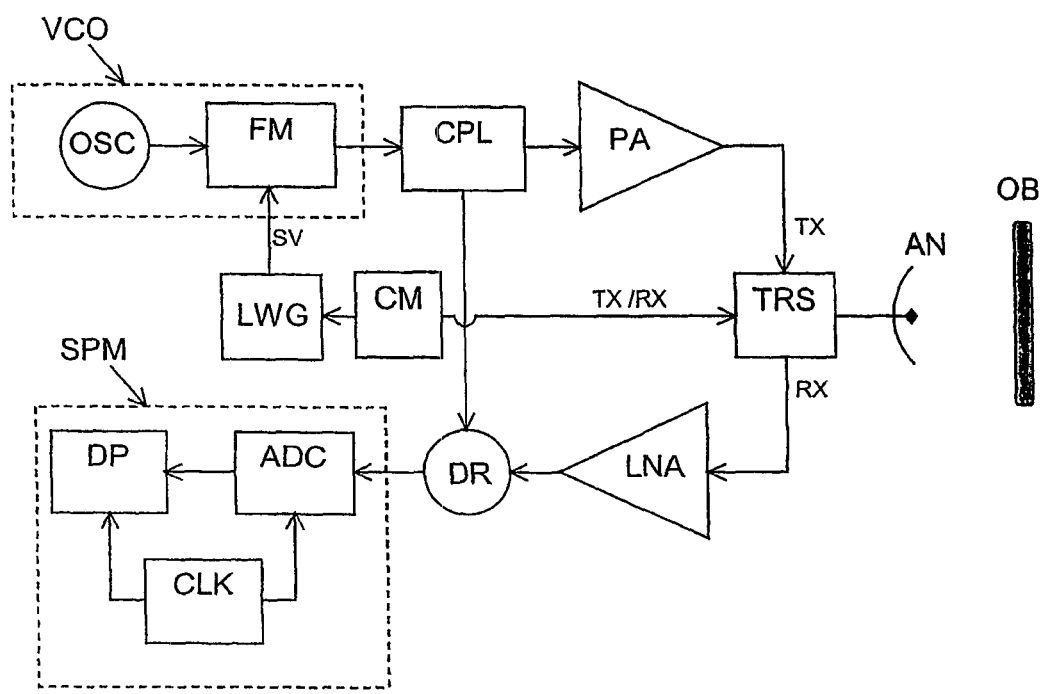
FIG. 1 is a block diagram of a conventional FMICW radar system used for automotive collision avoidance.
Figure 6:
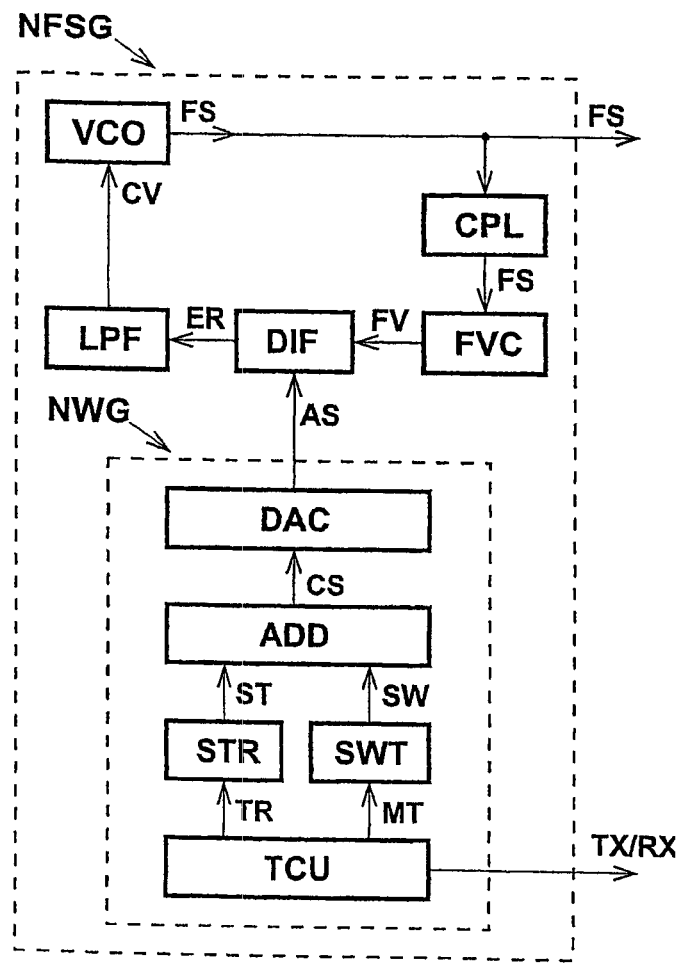
FIG. 6 is a simplified functional block diagram of a non-linear frequency sweep generator for generating the waveform of FIGS. 5a to 5c.

The embodiment of FIG. 11 has a non-linear frequency sweep generator NFSG instead of blocks CM, LWG and VCO of the automotive FMICW radar depicted in FIG. 1. FIG. 6 is a simplified functional block diagram of the non-linear frequency sweep generator NFSG. The non-linear frequency sweep generator NFSG comprises a coupler CPL, a frequency-to-voltage converter FVC, a differential amplifier DIF, a loop filter LPF, a voltage-controlled oscillator VCO and a non-linear waveform generator NWG.

The non-linear waveform generator NWG comprises a timing/control unit TCU, a digital staircase generator STR, a digital sweep segment generator SWT, a digital adder ADD, and a digital-to-analog converter DAC.

The functions and operations of the non-linear waveform generator NWG can be summarised as follows:

1. In response to a time sequence of trigger pulses TR supplied by the timing/control unit TCU, the digital staircase generator SIR, that may be an 'up/down' (reversible) counter, produces consecutive binary numbers ST in ascending or descending order, in an alternating fashion. The duration of each 'step' of the staircase waveform is equal to the pulse repetition interval $T_{PRI}$.
2. During each pulse repetition interval $T_{PRI}$, the digital sweep segment generator SWT receives a sequence of M pulses MT from the timing/control unit TCU to produce a digital approximation SW to a logarithmic sweep segment; the type of sweep segment being produced, 'up' or 'down', corresponds directly to a rising or falling digital staircase pattern supplied by the digital staircase generator STR.
3. Each sweep segment SW is suitably superimposed in the digital adder ADD on a respective step ST of a staircase pattern to produce an element CS of a digital representation of a 'corrugated' triangular pattern of FIG. 5b; each digital representation CS is then transformed into a respective voltage value AS in the digital-to analog converter DAC.

The digital sweep segment generator SWT may, for example, be implemented with the use of a suitable counter whose outputs are utilized as addresses of a read-only memory functioning as a 'look-up' table. The memory will store a digital approximation to a logarithmic function; for example, two suitable approximations, referred to as 'American mu-law' and 'European A-law', are widely used in digital speech compression, as known to those skilled in the art.

The functions and operations of the non-linear frequency sweep generator NFSG, configured as a 'closed-loop' control system, can be summarised as follows:

1. A fraction of the voltage of an output frequency sweep FS, diverted by a coupler CPL, is fed to the frequency-to-voltage converter FVC to produce a voltage signal FV proportional to the instantaneous frequency of signal FS.
2. Two signals: FV that represents the trajectory of the instantaneous frequency of the voltage-controlled oscillator VCO, and AS that represents a required 'corrugated' staircase frequency pattern, are subtracted in a differential amplifier DIF to produce a time-varying error voltage ER indicative of the discrepancy between the two frequency patterns, the one being actually produced and the required one.
3. The time-varying error voltage ER is processed in a low-pass 'loop' filter LPF to produce a control voltage CV that modifies the frequency of the voltage-controlled oscillator VCO in such a manner as to make it follow the required 'corrugated' staircase frequency pattern.

In a practical hardware implementation, the voltage-controlled oscillator VCO, employed by the non-linear frequency sweep generator NFSG, may, for example, operate in a 2-GHz frequency band, owing to the availability of inexpensive commercial off-the-shelf RF devices. Subsequently, the VCO signal can be 'upconverted' to a desired operational frequency, such as 77 GHz or 95 GHz, by a conventional combination of an RF mixer followed by a suitable bandpass filter, as known from the prior art.

Figure 7A:
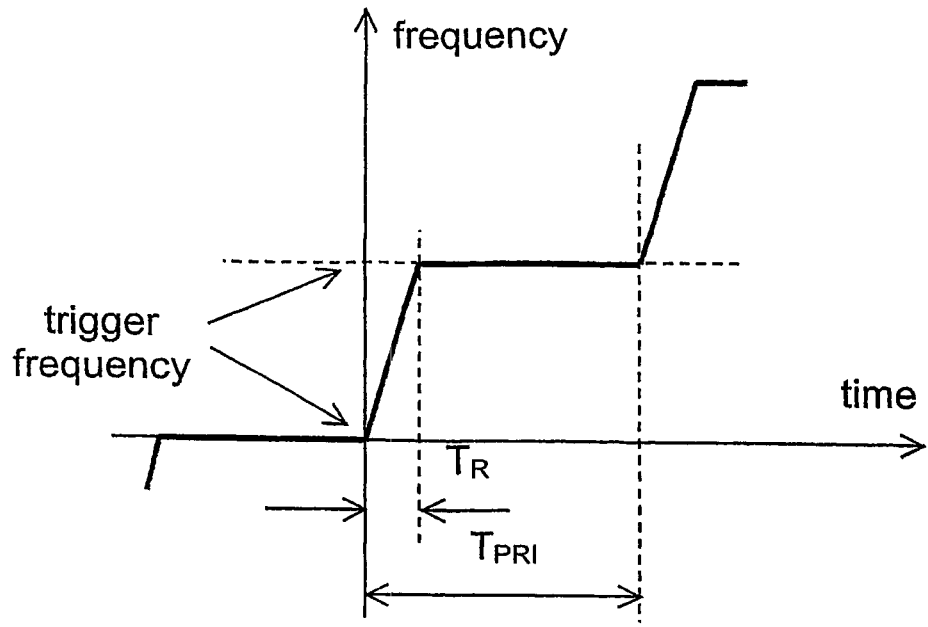
FIGS. 7a and 7b illustrate examples of piecewise linear frequency/time characteristics of a waveform used in another system in accordance with the present invention.

FIG. 7a depicts an example of the frequency/time characteristic of a different non-linear frequency sweep, used in a modified embodiment of the invention. In this case, a complete up-sweep comprises a plurality of identical ramp sweep segments. Because each sweep segment has a constant slope between a trigger time and a terminal time $T_R$ at which a next trigger frequency is reached, the maximum radar range will correspond to that determined by the value of the terminal time. Such an arrangement results in an enhanced performance at shorter distances and, therefore, is of particular importance in short-range applications of automotive radar, such as cruise control and 'stop-and-go' travel.

Figure 7B:
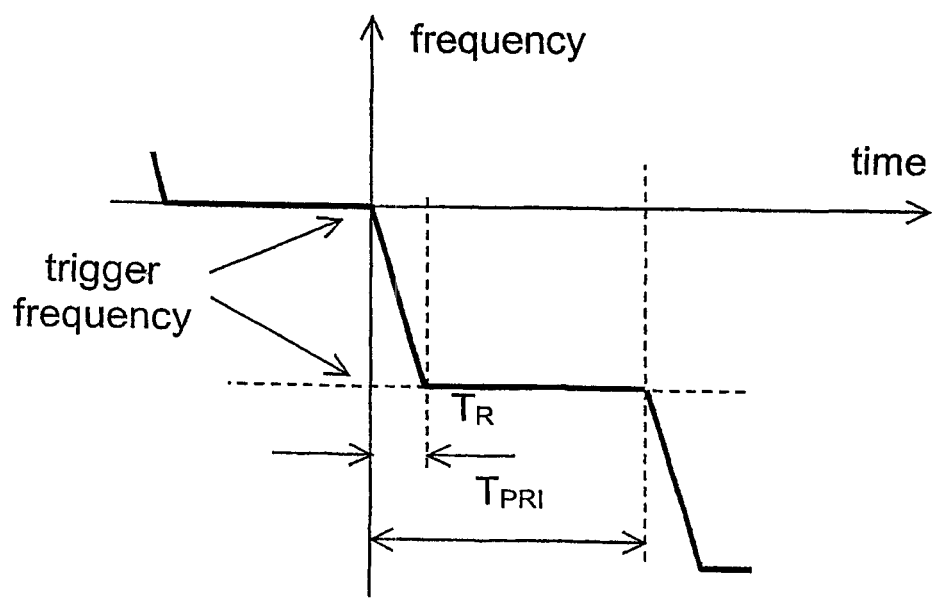

FIG. 7b depicts an example of a sweep segment used for the construction of a frequency down-sweep.

The following Example 2 analyses a potential improvement in the short-range performance of an automotive FMICW radar when a conventional linear frequency sweep is replaced by the piecewise linear frequency sweep of this embodiment of the invention.

EXAMPLE 2

Consider again a notional automotive FMICW radar of Example 1, and assume that the duration of a linear sweep segment has been reduced from 2 μs to 400 ns. In such a case, the maximum operational distance decreases to 60 m, but the local slope of the frequency/time characteristic increases from the notional value of 20 Hz/ns to 100 Hz/ns. Consequently, for an obstacle at a distance of 3 m, the beat frequency $F_D$ will increase from 400 Hz to 2000 Hz. Therefore, the task of distance determination through spectral analysis within the time interval $T_{SW}=4$ ms and frequency resolution of $1.3/T_{SW}=325$ Hz (when a Hamming window is used) will now be much easier.

Figure 8:
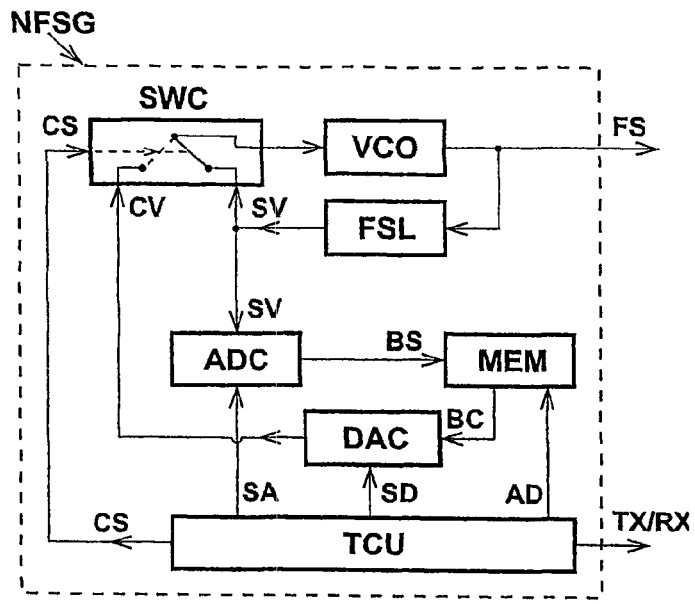
FIG. 8 is a simplified functional block diagram of a piecewise linear frequency sweep generator for generating the waveform of FIGS. 7a and 7b.

FIG. 8 is a simplified functional block diagram of a non-linear (but piecewise linear) frequency sweep generator NFSG for use in the arrangement of FIG. 11 to generate the waveform of FIGS. 7a and 7b.

The non-linear frequency sweep generator NFSG comprises a voltage-controlled oscillator VCO, a frequency-sweep linearizer FSL, an analog-to-digital converter ADC; a digital-to-analog converter DAC, a suitable memory MEM, a switch SWC, and a timing/control unit TCU.

The frequency-sweep linearizer FSL may be one of the known systems used in conventional FMCW and FMICW radars. The linearizer FSL produces a sweep voltage SV shaped in such a manner as to obtain a linear change of frequency of the voltage-controlled oscillator VCO.

The functions and operations of the system depicted in FIG. 8 can be summarised as follows:
1. The system operates in two modes:
    a standard (full-range) mode, in which the voltage-controlled oscillator VCO receives a control voltage SV from the linearizer FSL via switch SWC;
    a reduced-range (zooming) mode, in which the voltage-controlled oscillator VCO receives, via switch SWC, a control voltage CV from the digital-to-analog converter DAC.
2. When the system is operating in a standard mode, the analog-to-digital converter ADC samples the control voltage SV at sampling times SA determined by the timing/control unit TCU. Binary values of the samples of voltage SV are stored in the memory MEM at locations AD supplied by the timing/control unit TCU. After a sweep interval $T_{SW}$ has elapsed, the memory MEM will have contained a discrete-time binary representation of a sweep voltage waveform SV causing a linear frequency change of the voltage-controlled oscillator VCO.
3. When the system is operating in a reduced-range (zooming) mode, the digital-to-analog converter DAC receives from the memory MEM binary values BC of the stored samples of control voltage SV at the time instants SD determined by the timing/control unit TCU. However, during the pulse repetition interval $T_{PRI}$, the 'play-back' process is speeded up in such a manner as to reach a next trigger frequency within a time interval $T_R$ shorter than the pulse repetition interval $T_{PRI}$. As a result, the local slope $S_{FT}$ of the frequency/time characteristic will be increased by a factor of $T_{PRI}/T_R$, leading to a significant improvement of frequency, hence range, determination.

Figure 9:
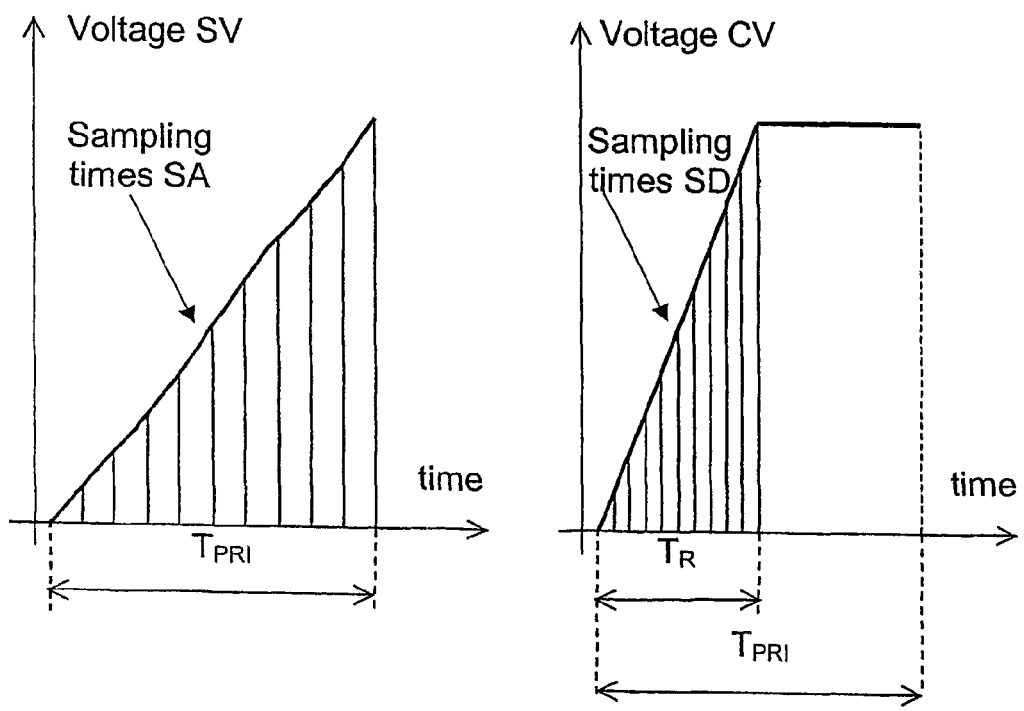
FIG. 9 depicts schematically timing diagrams of acquisition of samples and generation of values in a system of the present invention.

FIG. 9 depicts schematically timing diagrams of the two processes:
    acquisition of samples SV;
    generation of values CV.

In an automotive FMICW radar, the two modes of operation may alternate. For example, the standard mode may be employed for exploratory purposes to scan the full range and register potential obstacles, whereas the reduced-range (zooming) mode may be used to examine obstacles located closer to the radar.

The embodiment of FIG. 11 also includes a further feature which can improve the performance of the automotive FMICW radar, particularly at very short distances, when only one obstacle may be present. The signal processor module SPM incorporates a frequency doubling circuit FD for doubling the frequency of the processed signal prior to any spectral analysis. As a result, the value of the beat frequency will be doubled, leading to a significant improvement of frequency, hence range, determination.

Figure 10:
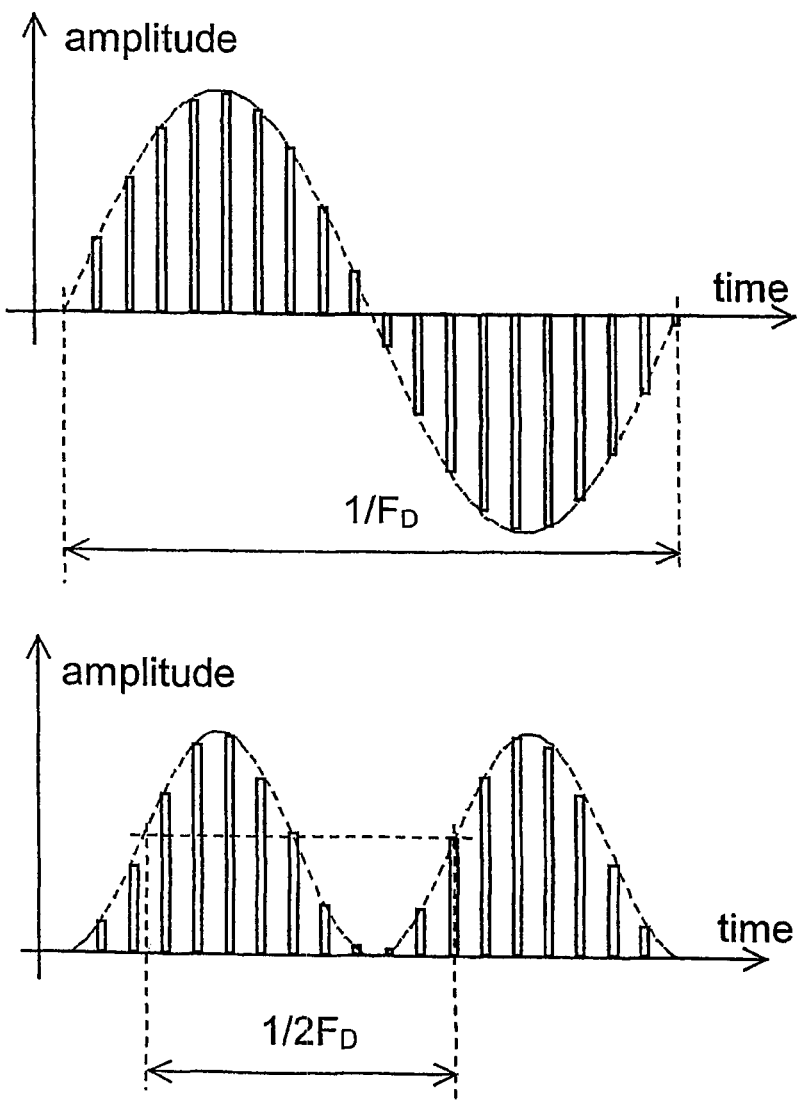
FIG. 10 depicts schematically a primary sequence of pulses with a sinusoidal envelope and a resulting sequence of pulses obtained via a squaring operation used in embodiments of the present invention.

The frequency doubling circuit FD may be arranged to perform a signal squaring operation. FIG. 10 depicts schematically a primary sequence of pulses with a sinusoidal envelope representing a beat frequency $F_D$, and a resulting sequence of pulses observed at the output of a squaring circuit. The envelope of the resulting pulse sequence is also sinusoidal, yet it varies with frequency $2F_D$.

The application of non-linear frequency sweeps and/or frequency doubling (via squaring) in an automotive FMICW radar will result in a non-linear relationship between the measured beat frequency and distance being determined. Consequently, a suitable frequency/range transformation will have to be included in a signal processing algorithm.

Various alternatives to a squaring circuit are possible. For example, the circuit FD may be arranged to derive the absolute value of the signal delivered thereto. Instead of a frequency doubling circuit arranged to derive the second harmonic of the signal, a circuit deriving a higher-order harmonic could be used.

The foregoing description of preferred embodiments of the invention has been presented for the purpose of illustration and description. It is not intended to be exhaustive or to limit the invention to the precise form disclosed. In light of the foregoing description, it is evident that many alterations, modifications, and variations will enable those skilled in the art to utilize the invention in various embodiments suited to the particular use contemplated.

The invention claimed is:

1. A method of determining a distance to an object, the method comprising:

generating a primary, frequency-modulated signal having a frequency which changes monotonically over a frequency range $\Delta F$ throughout a frequency sweep period $T_{SW}$;

deriving from the primary signal a reference signal and a transmission signal, the transmission signal comprising a plurality of successive pulses during the frequency sweep period, the plurality of successive pulses having different frequencies and each pulse being transmitted at the beginning of a respective pulse repetition interval, wherein the primary signal has a frequency which varies, during a beginning part of each pulse repetition interval, at a greater rate than the mean rate $\Delta F/T_{SW}$ of frequency change for the frequency sweep period $T_{SW}$;

transmitting the transmission signal;

obtaining a received signal comprising a reflection of the transmission signal from an object; and combining the reference signal with the received signal to derive a beat frequency indicative of the distance to the object.

2. A method as claimed in claim 1, wherein, within each pulse repetition interval, the frequency of the primary signal varies in a continuous non-linear manner, the frequency varying in a discontinuous manner at the boundaries of the pulse repetition intervals.

3. A method as claimed in claim 2 wherein, within each pulse repetition interval, the frequency of the primary signal varies in a logarithmic manner.

4. A method as claimed in claim 1, wherein, within each pulse repetition interval, the frequency of the primary signal varies in a piece-wise linear manner.

5. A method as claimed in claim 1, wherein the frequency/time characteristic of the primary signal within each pulse repetition interval is a shifted version of the characteristic within other pulse repetition intervals.

6. A method as claimed in claim 1, including the step of switching between a first mode in which the primary signal has a frequency which varies during an early part of each pulse repetition interval at a greater rate than the mean rate $\Delta F/T_{SW}$ of frequency change for the frequency sweep period $T_{SW}$, and a second mode in which the primary signal has a frequency which varies linearly throughout multiple pulse repetition intervals.

7. A method as claimed in claim 1, further comprising the step of deriving a harmonic of the beat frequency, the harmonic being at least the second harmonic, and determining the range of the object from said harmonic.

8. A method as claimed in claim 7, wherein the harmonic is derived by obtaining the absolute value of a signal obtained by combining the reference signal with the received signal.

9. A method as claimed in claim 7, wherein the harmonic is derived by squaring a signal obtained by combining the reference signal with the received signal.

10. A method as claimed in claim 1, further comprising dividing the frequency sweep period $T_{SW}$ into a number of non-overlapping and contiguous time subintervals, wherein within each such subinterval the rate of frequency change for the leading portion of the subinterval being greater than the mean rate $\Delta F/T_{SW}$ of frequency change for the entire interval $T_{SW}$, and wherein said transmission signal comprises successive segments of the primary signal, each such segment corresponding to the leading portion of a respective time subinterval.

11. A method as claimed in claim 10, wherein said time subintervals are equal.

12. A method as claimed in claim 10, wherein said successive segments of the primary signal are equal.

13. A method as claimed in claim 10, wherein said time subintervals are equal and wherein said successive segments of the primary signal are equal.

14. An apparatus for determining a distance to an object, the apparatus comprising:

a signal generator operable to generate a primary, frequency-modulated signal having a frequency which changes monotonically over a frequency range $\Delta F$ throughout a frequency sweep period $T_{SW}$;

a signal processor operable to derive from the primary signal a reference signal and a transmission signal, the transmission signal comprising a plurality of successive pulses during the frequency sweep period, the plurality of successive pulses having different frequencies and each pulse being transmitted at the beginning of a respective pulse repetition interval, wherein the primary signal has a frequency which varies, during a beginning part of each pulse repetition interval, at a greater rate than the mean rate $\Delta F/T_{SW}$ of frequency change for the frequency sweep period $T_{SW}$;

an antenna for transmitting the transmission signal and for obtaining a received signal comprising a reflection of the transmission signal from an object; and a signal combiner operable to combine the reference signal with the received signal to derive a beat frequency indicative of the distance to the object.

* * * * *